US007596429B2

(12) United States Patent
Cardinal et al.

(10) Patent No.: US 7,596,429 B2
(45) Date of Patent: Sep. 29, 2009

(54) IRRIGATION SYSTEM

(75) Inventors: Bruce J. Cardinal, Mill Valley, CA (US); Gordon A. Stewart, Sebastopol, CA (US); Gregor A. Berkowitz, San Francisco, CA (US); Michael Fogarty, San Francisco, CA (US)

(73) Assignee: ET Water Systems, Inc., Corte Madera, CA (US)

( * ) Notice: Subject to any disclaimer, the term of this patent is extended or adjusted under 35 U.S.C. 154(b) by 0 days.

(21) Appl. No.: 10/732,911

(22) Filed: Dec. 10, 2003

(65) Prior Publication Data

US 2004/0181315 A1 Sep. 16, 2004

Related U.S. Application Data

(60) Provisional application No. 60/432,505, filed on Dec. 10, 2002, provisional application No. 60/504,314, filed on Sep. 17, 2003.

(51) Int. Cl.
*G06F 19/00* (2006.01)
(52) U.S. Cl. ........................................ 700/284; 239/64
(58) Field of Classification Search ................. 700/284, 700/83–85, 15–16; 239/64, 69, 63; 705/37; 707/124.1, 7; 702/3; 137/1
See application file for complete search history.

(56) References Cited

U.S. PATENT DOCUMENTS

| 4,209,131 | A | | 6/1980 | Barash et al. | |
|---|---|---|---|---|---|
| 4,962,522 | A | | 10/1990 | Marian | |
| 5,193,570 | A | | 3/1993 | Mott | |
| 5,208,855 | A | | 5/1993 | Marian | |
| 5,870,302 | A | * | 2/1999 | Oliver | ......................... 700/11 |
| 6,076,740 | A | | 6/2000 | Townsend | |
| 6,098,898 | A | | 8/2000 | Storch | |
| 6,102,061 | A | * | 8/2000 | Addink | ......................... 137/1 |
| 6,298,285 | B1 | * | 10/2001 | Addink et al. | .............. 700/284 |
| 6,647,319 | B1 | * | 11/2003 | Goldberg | .................... 700/284 |
| 6,675,098 | B2 | * | 1/2004 | Peek et al. | ..................... 702/3 |
| 6,823,239 | B2 | * | 11/2004 | Sieminski | ................... 700/284 |
| 6,847,892 | B2 | * | 1/2005 | Zhou et al. | ................... 701/213 |
| 6,892,114 | B1 | * | 5/2005 | Addink et al. | .............. 700/284 |
| 2003/0182022 | A1 | * | 9/2003 | Addink et al. | .............. 700/284 |
| 2004/0030456 | A1 | * | 2/2004 | Barlow et al. | ............... 700/284 |
| 2005/0171646 | A1 | * | 8/2005 | Miller | ......................... 700/284 |

* cited by examiner

*Primary Examiner*—Kidest Bahta
(74) *Attorney, Agent, or Firm*—Perkins Coie LLP

(57) ABSTRACT

A technique for controlling an irrigation system is disclosed. The technique comprises receiving landscape information, receiving environmental information, deriving an irrigation schedule based on the landscape information and the environmental information, and sending the irrigation schedule to an irrigation control unit.

66 Claims, 7 Drawing Sheets

IRRIGATION SYSTEM

CROSS REFERENCE TO RELATED APPLICATIONS

This application claims priority to U.S. Provisional Patent Application No. 60/432,505 entitled "AUTOMATED LANDSCAPE IRRIGATION CONTROL SYSTEM" filed Dec. 10, 2002 which is incorporated herein by reference for all purposes.

This application claims priority to U.S. Provisional Patent Application No. 60/504,314 entitled "AUTOMATED LANDSCAPE IRRIGATION CONTROL SYSTEM" filed Sep. 17, 2003 which is incorporated herein by reference for all purposes.

FIELD OF THE INVENTION

The present invention relates generally to irrigation systems. More specifically, an automated irrigation system is disclosed.

BACKGROUND OF THE INVENTION

Irrigation is an important aspect of landscaping. A properly designed irrigation system should supply enough water to guarantee plant health and keep wasted water at a minimum. Some traditional watering systems allow their users to manually program watering schedules. Such systems generally have suboptimal water usage since the watering schedules typically do not take into account the current rate of water loss.

Some more sophisticated irrigation systems have watering units with built-in programs that adjust the amount of water applied by the watering units. The sensors provide feedback to the watering units, which use the information to adjust the amount of water used. Such systems, however, tend to be expensive for several reasons. The watering units are required to have built-in intelligence for computing new watering schedules based on sensor input and/or user input. Additionally, changes to the configuration process or watering formula require that hardware and/or software upgrades be made to each watering unit.

It would be desirable to have a cost effective irrigation system that could calculate a watering schedule based on information source available to the system, and provide an updated watering schedule to a watering unit as needed. It would also be useful if such a system could adjust its watering schedule automatically.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for controlling an irrigation system is disclosed. In some embodiments, landscape information and environmental information are provided. An irrigation schedule based on the landscape information and the environmental information is derived. The irrigation schedule is then sent to an irrigation control unit. In some embodiments, the user is given a user interface to configure and monitor the system via a network. In some embodiments, the irrigation data is sent to the irrigation control unit via the Internet. Existing phone line is used to provide Internet access in some embodiments.

Figure 1:
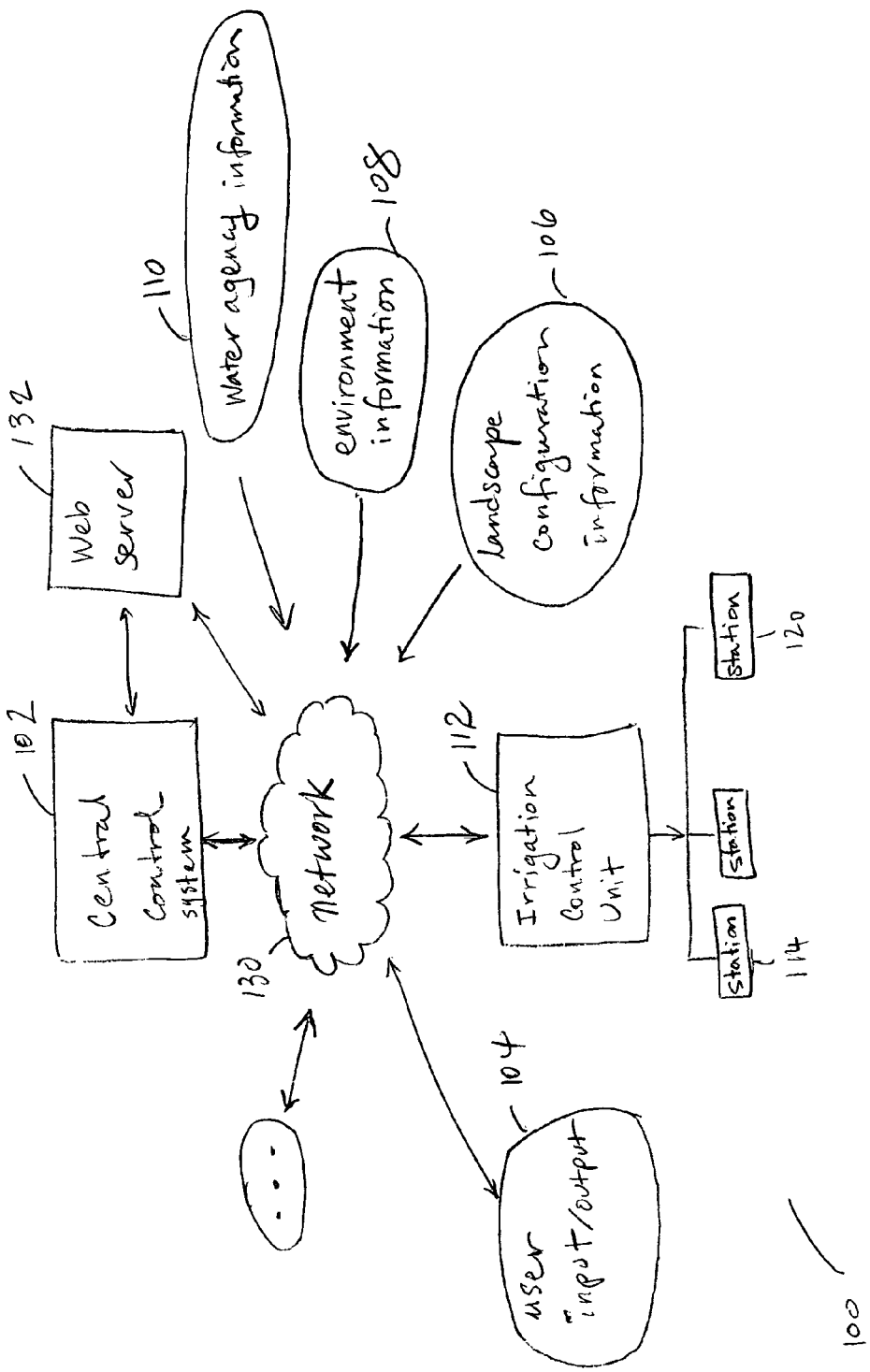
FIG. 1 is a system diagram illustrating an automated landscape irrigation control system (ALICS) according to one embodiment.

FIG. 1 is a system diagram illustrating an automated landscape irrigation control system (ALICS) according to one embodiment. ALICS 100 shown in this example is an intelligent irrigation control system that provides water for irrigated areas based on the current conditions. The area controlled by the ALICS may be divided into zones based on microclimate, landscape type, or other factors affecting water requirement.

ALICS 100 includes a central control system (CCS) 102 that receives, analyzes and stores data from a variety of sources, including landscape information 106 and environmental information 108. As used herein, landscape information refers to information about the landscape to be irrigated, including irrigation method, soil type, landscape slope, plant type, root depth, sprinkler precipitation rate, distribution uniformity, dripline diameter, emitter flow rate, number of emitters per plant, etc. Environmental information refers to information about the environment surrounding the landscape to be irrigated, including evapotranspiration (ET) data, rainfall data, weather information, etc. In some embodiments, although the landscape information can be modified to reflect changes in the landscape, the changes are relatively rare and the landscape information tends to remain relatively static after it is initially configured. The environmental information, on the other hand, is ever changing and therefore updated more frequently. In this example, the information is sent from its source to CCS 102 via a network 130. Throughout this specification, a network is referred to as a medium over which information is sent, including telephone networks, wireless networks, proprietary networks, the Internet, intranets, local area networks, wide area networks, or combinations thereof. In the following examples, for the purpose of illustration, a network based on Transmission Control Protocol/Internet Protocol (TCP/IP) is discussed extensively. Other communications protocols are also applicable.

In the embodiment shown in FIG. 1, CCS 102 adjusts the amount of irrigation based on the current rate of water loss due to evaporation and plant transpiration (also known as the rate of evapotranspiration or ET), as well as landscape configuration information 106 and user input 104. Data from other sources may also be used. In some embodiments, CCS 102 functions as a central data storage facility for the ALICS, storing information received, including user input 104, landscape configuration information 106, environment data 108 and water agency information 110. In some embodiments, CCS 102 also provides notifications to users and performs other functions associated with the maintenance and operations of the ALICS. As used herein, users refer to individuals or organizations that are responsible for the setup and/or management of the irrigation schedule, such as customers of the ALICS, property owners and managers, landscape contractors, gardeners, operators, water management agency personnel, etc.

ALICS 100 also includes a server 132 that provides management applications and user interfaces. In this example, server 132 is a web server that provides a web interface to the users. There are several ways to provide the web interface, including via a web browser such as Internet Explorer, via a client-side networking application or any other appropriate programs. Web server 132 communicates with users via network 130, and exchanges data with CCS 102 via the same network or a separate network. The user may access the websites provided by the web server from a computer, a wireless device such as a wireless personal digital assistant (PDA), or any other appropriate device with networking capabilities.

A user can log in a website controlled by the web server to perform functions such as configuration, monitoring and management. In some embodiments, the web server provides separate websites or user interfaces for a regular user such as a property owner and a super user such as an ALICS administrator. Additional websites or user interfaces may be provided for business partners such as water agencies or landscape designers. In some embodiments, the web server includes multiple devices such as application servers, database servers, redundancy servers, etc. In some embodiments, the functions of the web server are integrated into CCS 102 and no separate device is required. In some embodiments, multiple users (such as property owners, landscape contractors and water agency personnel) can access the same account and different users can have different levels of access. For example, a supervisor may be able to access more features and have greater control than a regular user. In some embodiments, a user may access and control many sites.

The inputs from various sources are transferred to CCS 102, which uses the inputs to perform functions such as adjusting an irrigation schedule, changing the configuration of irrigation control unit (ICU) 112, providing user feedback and alerts, etc. The number of ICUs controlled by the CCS and the number of stations controlled by each ICU depends on implementation and may vary for other embodiments.

In this example, ET is computed using environmental information 108. Details of ET computation and environmental information are discussed below. Based on ET data as well as landscape configuration information 106, user input 104 and water agency input 110, CCS 102 calculates an irrigation schedule. The irrigation schedule is a schedule that controls the operations of the ICU and determines the amount of water used. In some embodiments, the irrigation schedule includes a set of valve commands that control stations 114-120 by turning valves at the stations on or off at predetermined times. Watering days, non-watering days, and/or hourly restrictions may also be included in the irrigation schedule. Other appropriate instructions for controlling the amount of water used for irrigation may also be included in the irrigation schedule.

The irrigation schedule is transferred to ICU 112. In the example shown, ICU 112 resides on the property being managed and administers the irrigation schedule for one or more stations that irrigate various areas. In this example, ICU 112 is a parameter-driven device that receives its parameter settings and instructions from the CCS. Such a configuration offers greater central control over ICU functionality and simplified user interaction.

ET and rainfall data used to derive the irrigation schedule can be measured or estimated using a variety of techniques. In some embodiments, ET and rainfall data is estimated based on environmental information, which may include real-time weather data, soil moisture data, rain sensors, etc. In some embodiments, an automated weather station is installed and operated in each microclimate zone of the ALICS' service area. Each weather station gathers real-time weather data for use by the CCS to calculate ET and rainfall for the applicable microclimate zone. Each weather station includes one or more sensors to gather temperature, relative humidity, wind speed, solar radiation, rainfall data, etc. In some embodiments, the weather stations accumulate and store the weather data, then transmit the data periodically to CCS 102. In some embodiments, the CCS periodically pulls the information from the weather stations.

In lieu of local weather stations, ET and rainfall data can be estimated by computers using satellite-gathered weather data supplied by service organizations such as the National Oceanic and Atmospheric Administration (NOAA), the National Weather Service (NWS), the U.S. military services, or any other appropriate sources. Computer-generated ET and rainfall estimates are developed by combining weather data supplied by existing weather stations with satellite-gathered weather data and estimating ET and rainfall values for intermediate locations using a process of interpolation.

In some embodiments, a subset of ET data, such as temperature or solar radiation measurements, is measured. These weather measurements are sent to the CCS periodically for irrigation schedule calculations. In some embodiments, a rain sensor is provided with each ICU and is used to suspend irrigation by measuring the amount of rainfall at a site and sending instructions to the CCS to suspend irrigation for the appropriate length of time in response to a rainfall event. In some embodiments, one or more soil moisture sensors are provided with each ICU and are used to estimate ET and effective rainfall (i.e., the amount of rainfall absorbed into the plant root zone) by measuring changes in soil moisture at the service site and/or weather station location. The soil moisture readings from the sensors can be used to determine the appropriate length of time to suspend irrigation for local ICUs in the event of a rainfall. In some embodiments, the data is sent over a network to the ICU which, in turn, sends the data to the CCS periodically for use in calculating the ICU watering schedule.

The environmental and landscape information, the irrigation schedule and/or other data may be transmitted to the ICU via a variety of communications networks. For example, the data may be transmitted over a local area network or a wide area network. In some embodiments, the ICU requests a new schedule by dialing out on a Plain Old Telephone Service (POTS) line to a local Point of Presence (POP) of an Internet Service Provider (ISP). The ISP provides a connection to the CCS over a TCP/IP network. Once the CCS receives the request, it sends a new irrigation schedule or other notification message to the POP via a TCP/IP network. The data is then transferred to the ICU over the local phone line. In some embodiments, the ICU is connected to the Internet using a broadband connection such as digital subscriber line (DSL), cable modem, or other appropriate connections. In some embodiments, the ICU is connected to the Internet via a wireless telephone connection. Several ICUs at the same customer site may share a wireless telephone account.

Figure 2A:
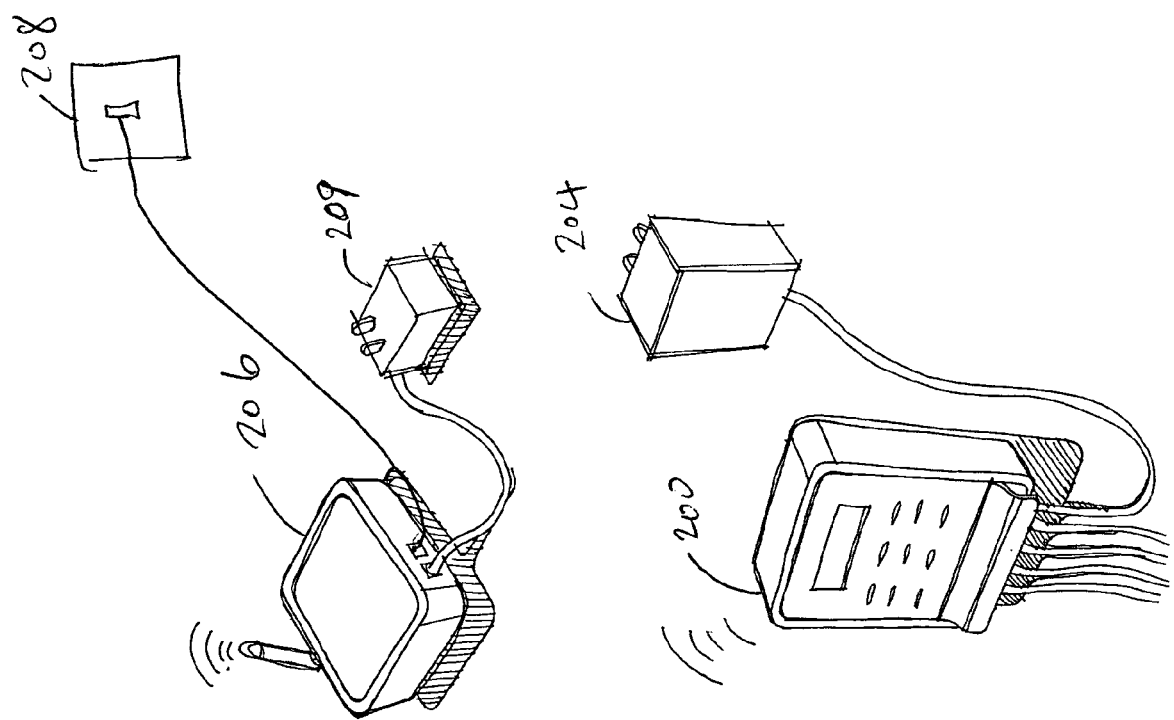
FIG. 2A is a diagram illustrating the communication between an irrigation control unit (ICU) and a property's Plain Old Telephone Service (POTS) line according to another embodiment.

In some embodiments, the ICU is connected to the CCS via an existing POTS line at the property. The connection between the ICU and the POTS line may be wired or wireless. In some embodiments, the ICU connects to the POTS line directly by connecting to a standard phone jack using a regular telephone cable. FIG. 2A is a diagram illustrating the communication between an ICU and a property's Plain Old Telephone Service (POTS) line according to another embodiment. In this example, the connection between ICU 200 and the POTS line includes a wireless connection. Power brick 204 supplies the ICU with power. ICU 200 includes a transceiver adapter (not shown) that communicates with a transceiver base station 206 via a wireless channel. The frequency and protocol used for communication depend on implementation and may vary for different embodiments. The base station, connected to a standard phone outlet 208, is able to send data to and receive data from the CCS. Power supply 209 provides power to the base station.

Figure 2B:
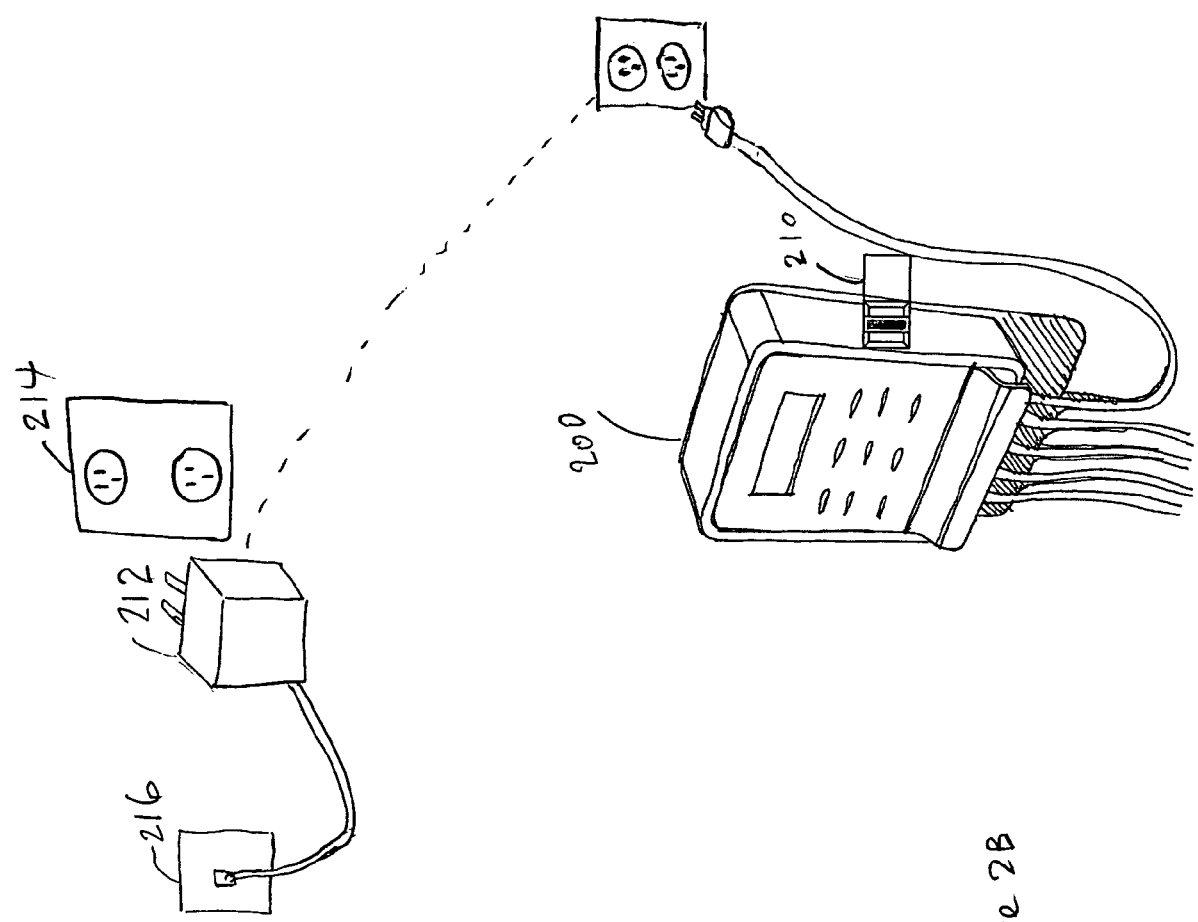
FIG. 2B is a diagram illustrating the communication between an irrigation control unit (ICU) and a property's Plain Old Telephone Service (POTS) line according to another embodiment.

FIG. 2B is a diagram illustrating the communication between an ICU and a property's Plain Old Telephone Service (POTS) line according to another embodiment. In this example, the ICU and the POTS line communicate using power line signaling over the property's existing power lines. ICU 200 includes a transceiver adapter 210 for transmitting and receiving data via the power line. A base station 212, connected to a power outlet 214, is able to communicate with adaptor 210 via the power line. The base station is also connected to a phone outlet 216 to send data to and receive data from the CCS.

Figure 3:
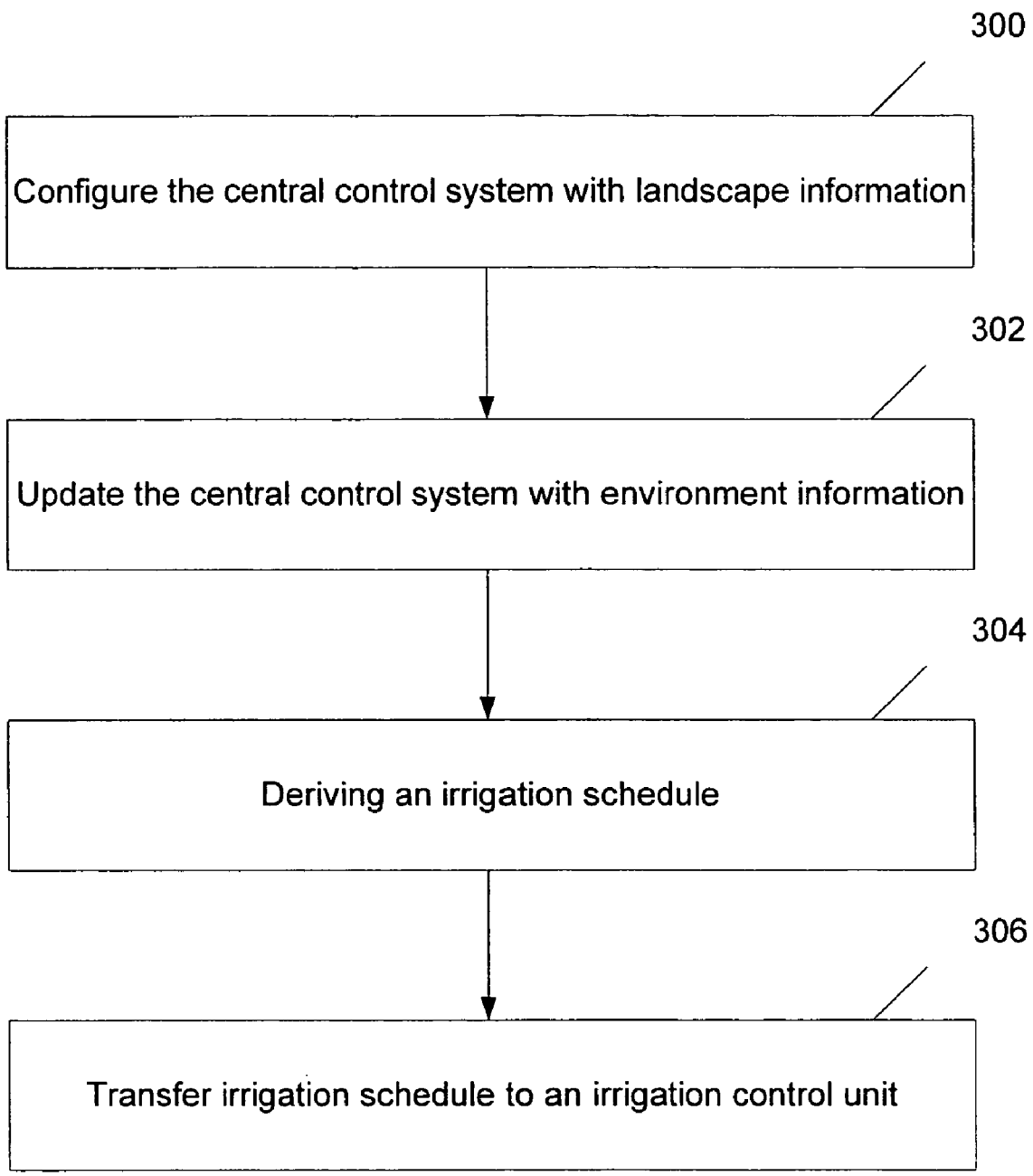
FIG. 3 is a flowchart illustrating the operations of a central control system according to one embodiment.

FIG. 3 is a flowchart illustrating the operations of a central control system according to one embodiment. In this example, once an ICU is installed, a user may configure the CCS with landscape information (300). The configuration is performed via a web interface. This information is stored by the CCS and is used to determine the irrigation schedule for each station managed by the ICU. CCS is updated with environmental information such as weather station measurements and soil moisture sensor (302). Optionally, adjustments can be made by the user, ALICS, and/or water agency.

ET and effective rainfall data are computed based on the environmental information and one or more irrigation schedules are computed based on the ET and effective rainfall data (304). The irrigation schedules are then transferred to the corresponding ICUs (306). In some embodiments, each ICU periodically places a local phone call to retrieve the irrigation schedule from the CCS, and stores the irrigation schedule in the ICU's memory. The ICU then executes the irrigation schedule.

Figure 4:
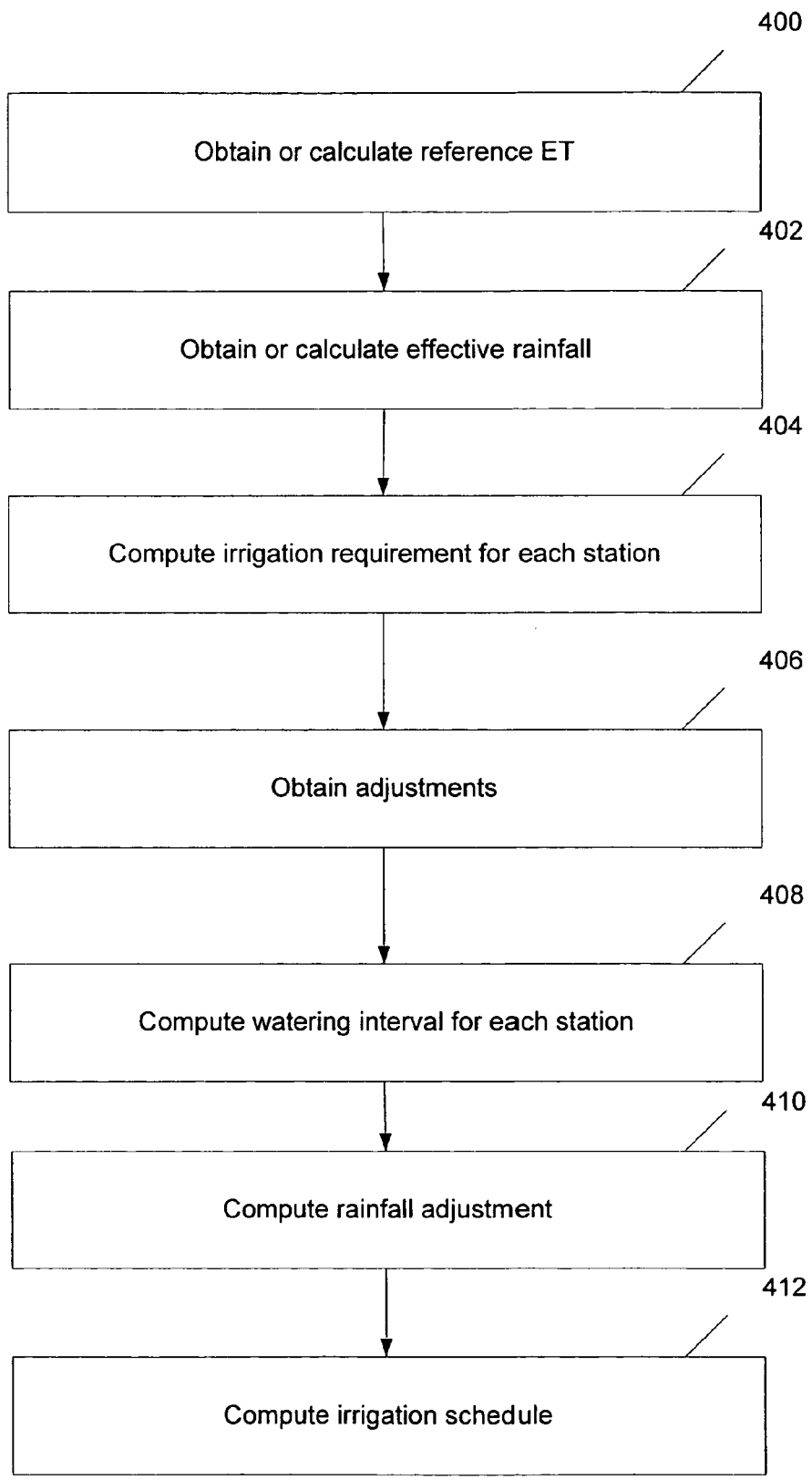
FIG. 4 is a flowchart illustrating the derivation of the irrigation schedule (304 of FIG. 3) according to one embodiment.

FIG. 4 is a flowchart illustrating the derivation of the irrigation schedule (304 of FIG. 3) according to one embodiment. In this example, a reference ET (denoted as $ET_o$) is obtained or calculated first (400). $ET_o$ used in this example is the accumulated amount of evapotranspiration for the preceding period. $ET_o$ is preferably measured as amount of water per time interval (e.g., inches of water per day). In one example, the $ET_o$ is accumulated for the preceding seven days (a rolling seven day average) and this value is used to determine the irrigation requirement for the next seven days. In another example, the $ET_o$ is accumulated for the preceding day and this value is used to determine the irrigation requirement for the next day.

In some embodiments, the reference ET is calculated for each microclimate zone within the ALICS service area using weather data supplied by a local weather station or other data sources used by the ALICS. The ALICS may use suitable equations such as ASCE, FAO Penman-Monteith or any other appropriate methods to compute $ET_o$. $ET_o$ values may be computed daily, or as often as they are required by the CCS. In some embodiments, the reference ET is calculated at the weather station or other data sources used by the ALICS and supplied to the ALICS.

Next, the amount of effective rainfall is calculated for any rainfall event (402). In this example, effective rainfall is the accumulated amount of rainfall for the preceding period absorbed into the plant root zone. Effective rainfall is preferably measured as amount of water per time interval (e.g., inches of water per day). In one example, effective rainfall is determined by multiplying the amount of accumulated rainfall for the preceding day by an effectiveness factor. The amount of effective rainfall is then used to determine the amount of time to suspend irrigation for each station.

In some embodiments, the effective rainfall is calculated for each microclimate zone within the ALICS service area using rainfall data supplied by a local weather station or other data sources used by the ALICS. The ALICS may use standard reference tables or any other appropriate methods to compute effective rainfall. Effective rainfall values may be computed daily, or as often as they are required by the CCS. In some embodiments, the effective rainfall is calculated at the weather station or other data sources used by the ALICS and supplied to the ALICS.

Returning to the example shown in FIG. 4, the irrigation requirement for each station is calculated (404). The irrigation requirement for a station is the total amount of water to be applied to that station during an irrigation event. The CCS can calculate the irrigation requirement for any period of time using any known formula. The formula may be modified as a result of continued refinements to its system, new research and developments in irrigation science, input provided by local water agencies or other sources, user feedback, research conducted by the ALICS, or other appropriate reasons. In some embodiments, the calculation takes into account the water usage by other ICUs and balances the water usage among the ICUs. In some embodiments, different methods are used for calculating irrigation requirements in different geographical areas and for stations irrigated by different methods (e.g., sprinkler vs drip, etc.). The calculation may be based on input provided by local water agencies, differing climatic conditions, etc.

There are several factors that can be used to calculate the irrigation requirement for a station, such as the current reference ET, current soil moisture data, types of plants to be irrigated, characteristics of the irrigated landscape, irrigation methods and preferences of the property owner, local water agency and the ALICS, etc. In some embodiments, the irrigation requirement is determined using the water balance method. In some embodiments, the irrigation requirement is determined using an accumulated ET threshold. In some embodiments, the irrigation requirement for a station is fixed for all irrigation events and the irrigation schedule varies based on changes in local ET. In some embodiments, the irrigation requirement for a station is derived using the following function:

Irrigation requirement for station=f{Root Depth, Soil Holding Capacity, Allowable Depletion, Precipitation Rate, Distribution Uniformity, Maximum Cycle Time, Minimum Soak Time, User Adjustment, ALICS Adjustment}

In the function above, the Root Depth is the root depth of the plants to be irrigated, Soil Holding Capacity is the amount water that a given soil type can hold per foot of soil, Allowable Depletion is the level of soil moisture depletion allowable before irrigation must occur, Precipitation Rate is the rate that water is applied to the landscape, Distribution Uniformity is the efficiency of water being applied, Maximum Cycle Time is the maximum length of time that water can be applied before runoff occurs, Minimum Soak Time is the minimum amount of time required between irrigation cycles, User Adjustment is a user adjustment to the amount of water being applied, and the ALICS Adjustment is an adjustment made by ALICS personnel to the amount of water being applied.

For illustration purposes, the following values are assumed for the function above:
  Root Depth: 18 inches
  Soil Holding Capacity for Loamy Soil: 1.5 inches of water per foot of soil
  Allowable Depletion: 50%
  Precipitation Rate: 2.0 inches per hour
  Distribution Uniformity: 70%
  Maximum Cycle Time: 10 minutes
  Minimum Soak Time: 10 minutes
  User Adjustment: 100% (No Change)
  ALICS Adjustment: 100% (No Change)

In one embodiment, the irrigation requirement for a station with the above assumed values is calculated as follows:
  Water Amount to be applied=$18 \times 1.5/12 \times 50\% = 1.13$ inches
  Run Time Multiplier=$1/(0.4+(0.006 \times 70\%))=1.22$
  Total Runtime=$(1.13/2.0) \times 1.22 \times 60=41.16$ minutes
  Number of Cycles=$41.16/10=4.116$ (Rounded Up=5)
  Irrigation Requirement: 8.23 minutes per cycle, 5 cycles, with 5 minutes soak time between cycles.

Figure 6A:
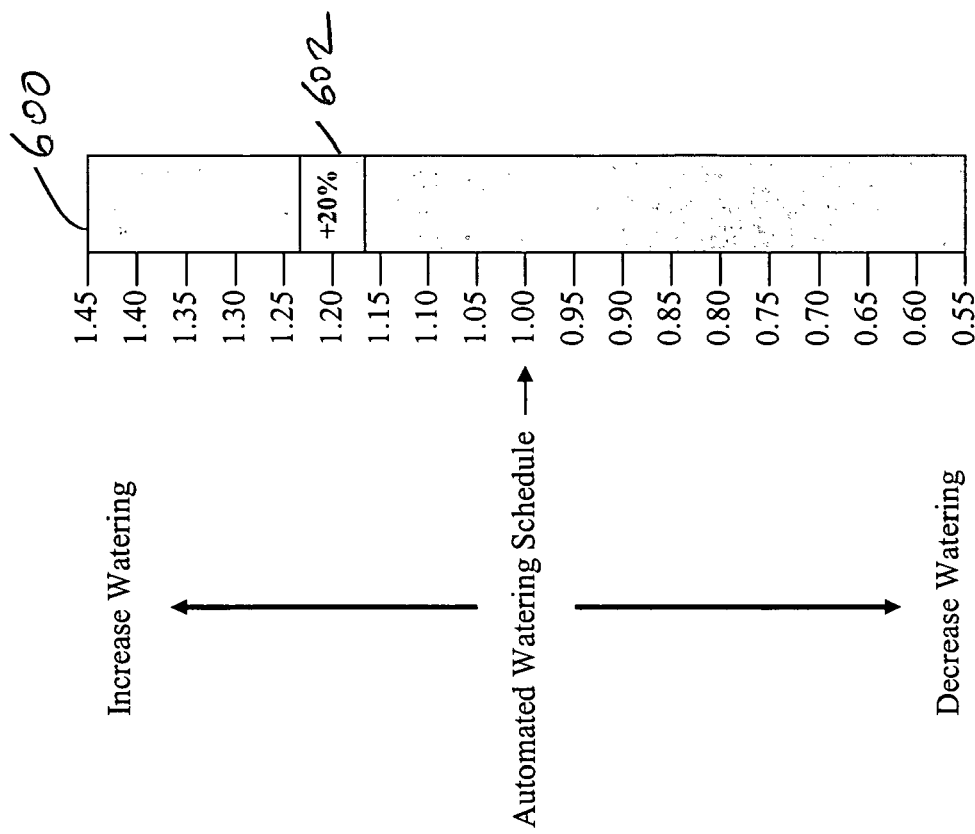
FIGS. 6A-6B are diagrams illustrating the user interface for changing the timing and amount of water applied to a station according to one embodiment.
Figure 6B:
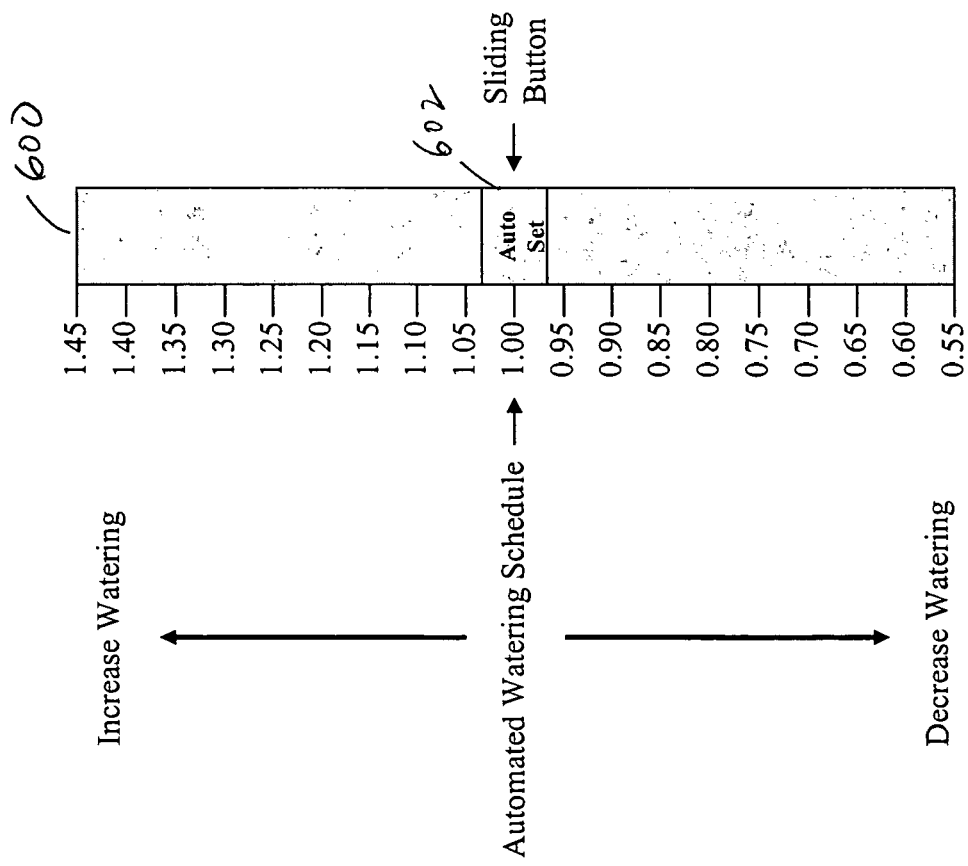

Optionally, adjustments to the system may be obtained (406). In some embodiments, the adjustments include user adjustments. In the above example, the user adjustment is a percentage change made by the user to the irrigation requirement for one or more stations. In some embodiments, various aspects of the watering schedule for an ICU, including the irrigation start time, watering days or non-watering days, and other factors can also be modified. In some embodiments, the user can override the automated watering schedule for any station by specifying a new schedule with different watering days, run times, etc. Details of selected user adjustments are shown in FIGS. 6A-6B.

In some embodiments, the adjustments include from adjustments the ALICS. In the above example, the ALICS adjustment is a percentage change made by ALICS personnel to the irrigation requirement for one or more stations. In some embodiments, various aspects of the watering schedule for an ICU, including the irrigation start time, watering days or non-watering days, and other factors can also be modified. In some embodiments, the ALICS can override the automated watering schedule for any ICU by specifying a new schedule with different watering days, run times, etc. Details of the ALICS adjustments are discussed below.

After any adjustments are computed (406), the watering interval for each station is then derived (408). The watering interval is estimated time in between irrigation events assuming weather conditions remain constant and there are no rainfall events. There are different methods for determining the watering interval. In some embodiments, the watering interval for a station is derived using the following function:

Watering interval for station=f{Root Depth, Soil Holding Capacity, Allowable Depletion, ETo, Plant Coefficient, Sun Exposure}

In the function above, the Root Depth is the root depth of the plants to be irrigated, Soil Holding Capacity is the amount water that a given soil type can hold per foot of soil, Allowable Depletion is the level of soil moisture depletion allowable before irrigation must occur, ETo is the reference evapotranspiration rate, Plant Coefficient is the plant coefficient for the current month for the types of plants in the irrigation zone, and Sun Exposure is the adjustment for the lack of sun exposure in the irrigation zone.

For illustration purposes, the following values are assumed for the function above:
  Root Depth: 18 inches
  Soil Holding Capacity for Loamy Soil: 1.5 inches of water per foot of soil
  Allowable Depletion: 50%
  ETo: 0.10 inches per day
  Plant Coefficient: 0.8
  Sun Exposure: 0.9

In one embodiment, the watering interval for a station with the above assumed values is calculated as follows:
  Water Amount to be applied=$18 \times 1.5/12 \times 50\% = 1.13$ inches
  Watering Interval=$1.13/(0.1 \times 0.8 \times 0.9)=15.7$ days After the watering interval (408) for each station is computed, the rainfall adjustment, if any, is calculated (410). The rainfall adjustment is used to adjust the watering schedule for an ICU in the event of rainfall. In some embodiments, the rainfall adjustment for an ICU delays watering for each station by the amount of the rainfall adjustment. There are different methods for determining the rainfall adjustment. In some embodiments, a rain sensor is located at the irrigated site and irrigation is suspended directly by the sensor. In some embodiments, the rainfall adjustment is derived by the CCS using rainfall data provided by a local weather station or other data sources used by the ALICS and sent to the ICU. In one embodiment, the rainfall adjustment is calculated by the CCS using the following function:

Rainfall adjustment=f{Rainfall, Rainfall Effectiveness, Average Daily ETo}

In the function above, Rainfall is the amount of rainfall during the period, Rainfall Effectiveness is the rate of effectiveness of the rainfall, and Average Daily ETo is the average daily reference evapotranspiration rate. Effective rainfall may be estimated by rainfall data gathered by a rain sensor located at a local weather station or at the irrigated site.

For illustration purposes, the following values are assumed for the function above:
  Rainfall: 0.2 inches
  Rainfall Effectiveness: 70%
  Average Daily ETo: 0.05 inches per day In one embodiment, the rainfall adjustment using the above assumed values is calculated as follows:

Rainfall adjustment=(0.2×0.7)/×0.05=2.8 days

Returning to the example shown in FIG. 4, the irrigation schedule for the ICU is calculated (412). The ICU irrigation schedule is the complete, optimized schedule for all stations that is sent to the ICU from the CCS on a periodic basis. There are different methods for determining the irrigation schedule for an ICU. In some embodiments, the irrigation schedule for a station is derived using the following function:

Irrigation schedule for an ICU=ƒ{Water Window, Irrigation Start Time, Non-Watering Days, Hourly Restrictions, Station Flow Rates, Maximum Allowable System Flow, Maximum Simultaneous Valve Limit, Individual Station Schedules}

In the function above, the Water Window is the range of hours during which the ICU is required to complete its irrigation cycle on watering days. It is set by the user via the web interface in some embodiments. The water window is preferably during nighttime and early morning hours. In some embodiments, the user is not required to specify the start time for the irrigation cycle. In some embodiments, the user selects a window during which irrigation can occur and the ALICS selects the specific time interval for the irrigation cycle within that window. This design enables the ALICS to shift ICU watering schedules if necessary to accommodate the needs of the ALICS or water agencies. For example, the ALICS may wish to adjust the watering schedule for selected ICUs in a particular area in order to alter the pattern that these ICUs call the CCS. Alternatively, the ALICS may shift ICU start times to assist water agencies in shaping their demand curve and managing peak period usage. In some embodiments, the start time is computed by the CCS. The CCS may optimize the start time based on plant requirements and the amount of ET.

In some embodiments, an optimized watering schedule is developed to reduce the amount of time required for watering. In some embodiments, if the optimized watering schedule developed by the CCS exceeds the user-defined water window, then the user is provided with options to expand the water window and/or select one or more stations that can operate outside the water window so that higher priority stations are watered during the water window.

The Irrigation Start Time is the time the ICU commences its irrigation cycle on watering days. In this example, the irrigation start time applies to the entire watering cycle and is not station-specific. The start time is preferably set by the ALICS during the water window selected by the property owner.

Non-Watering Days are days of the week when no irrigation is performed. In some embodiments, the non-watering days for individual stations are set according to the user's preference. In some embodiments, if the system-generated watering schedule for each station does not require watering every day, then the days that watering does not occur are the non-watering days. An example of a non-watering day may be the day of week that a landscape contractor or gardener performs weekly maintenance.

Hourly Restrictions are hours during the day when no irrigation is performed. In some embodiments, the hourly restrictions for individual stations are set according to the user's preference.

Station Flow Rate is the normal flow of water for a station during an irrigation event. Station flow rates may differ between stations. Maximum Allowable System Flow is the maximum flow of water that can be obtained by the irrigation system during an irrigation event. Station flow rates and maximum allowable system flow are preferably measured in gallons per hour. In some embodiments, station flow rates and the maximum allowable system flow are used to determine the number of stations that may irrigate simultaneously. The sum of the station flow rates for all stations operating simultaneously may not exceed the maximum allowable system flow. In some embodiments, station flow rates and the maximum system flow are entered into a website by the user. In some embodiments, station flow rates are automatically gathered from a flow sensor attached to the ICU and sent to the CCS. In some embodiments, the default setting for the number of stations that may water simultaneously is one.

The Individual Station Schedule is the final, adjusted irrigation schedule sent to the ICU for a station. In some embodiments, the individual station schedule includes the irrigation requirement, the watering interval, any user or ALICS adjustments, any rainfall adjustment, any non-watering days, and any hourly restrictions for the station.

the ALICS minimizes runoff during an irrigation event by limiting the duration of each irrigation cycle and utilizing minimum soak periods between cycles to ensure that water has been absorbed into the soil. The maximum cycle time and minimum soak time incorporated into the irrigation requirement for a station are calculated based on the precipitation rate, landscape slope, and soil type (404). The precipitation rate is the rate at which water is applied to the landscape. It is a function of the type of sprinklers, sprayers, emitters, etc. which are used to apply water to the landscape. The slope of the landscape affects the absorbency of the soil and influences the duration of a single watering cycle. Factoring slope into the watering schedule can avoid a situation in which water runs off a surface because it is applied to the soil faster than it can be absorbed. The degree of landscape slope affects the maximum cycle time, the number of cycles, and the minimum soak time in between cycles. Soil type also affects maximum cycle time and minimum soak time. Dense soils have less absorbency and slower intake rates than porous soils. For this reason, denser clay soils require shorter cycle times and longer soak times than sandy soils. There are different methods for calculating maximum cycle times and minimum soak times to avoid runoff. In some embodiments, the ALICS uses research and methods contained in a paper presented in November 1995 by Joseph Y. T. Hung and Arturo Mandoza entitled *Maximum Sprinkler Irrigation Runtime Without Runoff*, a paper presented in November 1996 by Joseph Y. T. Hung entitled *Sprinkler Soaking Time Between First and Second Irrigation Cycles Without Runoff*, an article written by Joseph Y. T. Hung, Ramesh Kumar, and Eudall Vis entitled *Sprinkler Irrigation on Slopes*, and a paper presented in March 1988 by Anibal Blandon and Roger Johnson entitled *Irrigation Efficiencies for Various Slopes With Changing Riser Angles*.

In some embodiments, an optimized watering schedule is derived based on user inputs such as the desired maximum time window during which the watering should occur, the maximum number of valves that the ICU can open at one time, the flow rate per valve, the maximum allowable flow for the ICU, etc. The watering schedule is calculated to reduce the amount of time required for watering. If the optimized watering schedule exceeds the user-defined water window, then the user is provided with options to expand the water window and/or select one or more drip-irrigated stations which can operate outside the water window so that the sprinkler-irrigated stations are watered during the water window.

In some embodiments, different algorithms may be used for calculating the irrigation requirement and/or irrigation schedule based on irrigation methods. Several examples of water algorithms include a water balance algorithm, a light-and-frequent algorithm and a deficit irrigation algorithm. The water balance algorithm is sometimes used for landscapes with sprinklers. Irrigation is applied when a predefined soil moisture threshold is reached. The light-and-frequent algorithm is sometimes used for landscapes with drip or bubbler irrigation. When the daily rate of ET reaches a certain minimum threshold (e.g., 0.1 inch per day), the amount of water lost through ET (adjusted for plant factors, seasonality, and shade factors) is replaced. The deficit algorithm is preferably used for plants that can be sustained with less than their optimal amount of irrigation water.

In some embodiments, the CCS automatically selects which algorithm to use based on information available. In some embodiments, the user is presented with options to choose an algorithm, or options for assisting the CCS to determine a suitable algorithm. For example, the user may choose a conservation option that allows the CCS to automatically calculate an acceptable reduction in water use based on the plant types. The level of irrigation below the optimal ET-based water level, referred to as deficit irrigation level, is specific to each station or zone of landscaping as well as the plant type for that station. In some embodiments, the amount of deficit irrigation for each station is calculated as a percentage of ET. In some embodiments, the user is given options to choose deficit irrigation automatically, semi-automatically or manually. The automatic option allows the ALICS or the local water agency to automatically implement a pre-defined deficit irrigation conservation option. The semi-automatic option allows the ALICS to implement a pre-defined conservation option after the user elects to participate in deficit irrigation (also referred to as opt-in). The manual option allows the users to initiate a request for using the conservation option by, for example, sending the request to the CCS from the website.

Figure 5:
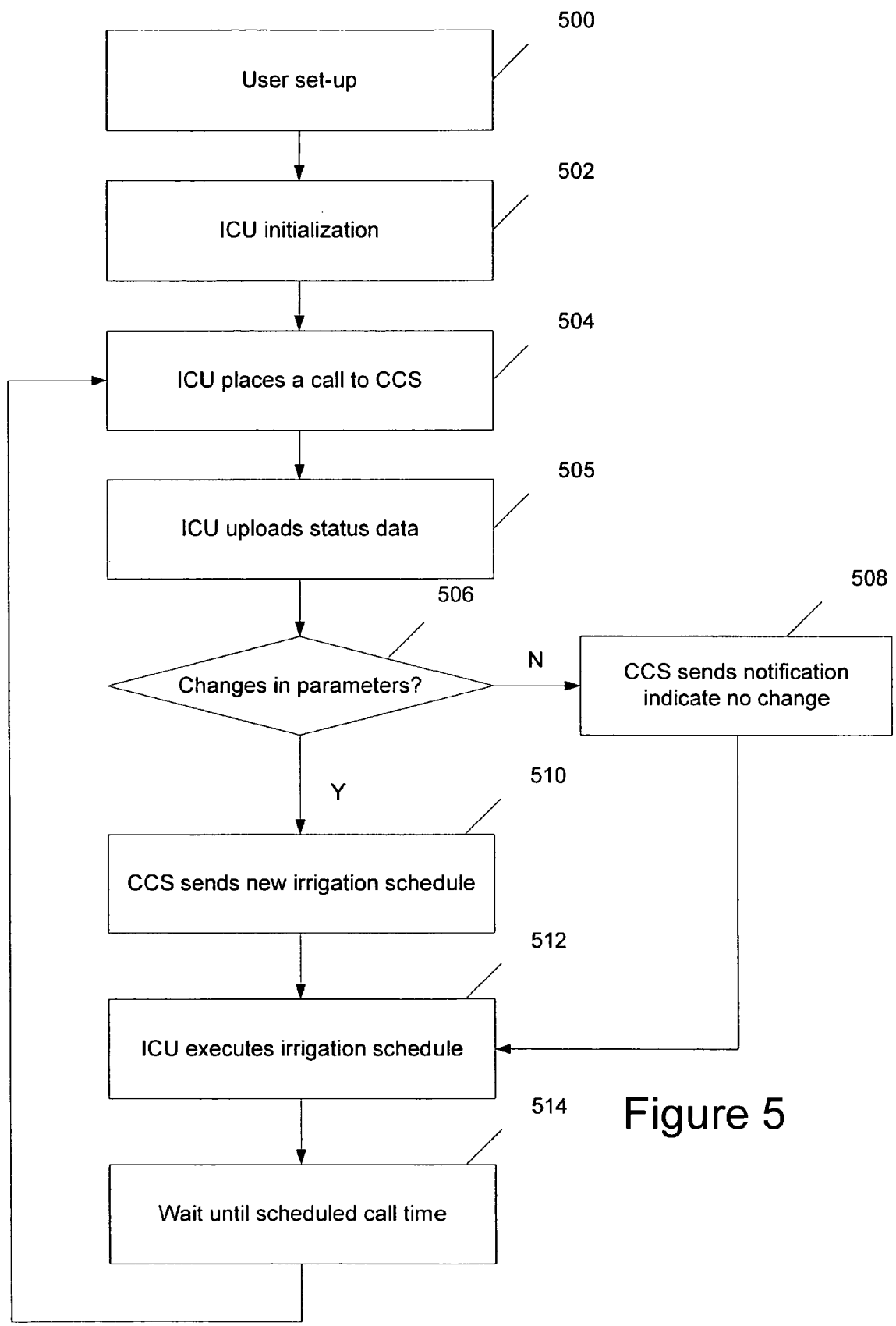
FIG. 5 is a flowchart illustrating the normal operations of an irrigation control unit according to one embodiment.

FIG. 5 is a flowchart illustrating the normal operations of an irrigation control unit according to one embodiment. In this example, the user accesses the web application and provides set-up information to the CCS (500). First-time users are required to enter the serial number of the ICU as well as username and password. Other set-up information required may include email address for future notification, name of local water agency and account number, water window during which irrigation should occur, preferred non-watering days, station flow rates, maximum allowable system flow, selection of local phone number for future ICU calls to CCS, information requested by local water agency such as willingness to reduce irrigation usage in times of drought or water shortage, selection of events for user notification by email, selection of landscape parameters per irrigation station, including: irrigation method, plant type, plant age or root depth, sun exposure, sprinkler precipitation rate, distribution uniformity, emitter flow rate, number of emitters per plant, dripline diameter of plants, soil type, landscape slope, etc.

During the initial set-up session, a user can view information about the operation of the ALICS and the ICU under configuration, including the location of the nearest weather station or other environmental data source, current ET for the microclimate zones, any automatic watering schedule configured by the CCS, etc.

The ICU is then initialized (502). In some embodiments, an ICU is manufactured with certain information stored in non-volatile memory, such as a unique serial number, a default password, a default toll-free number, and a default run time per station. During the initialization process, the ICU obtains information required for its operation from the CCS. In some embodiments, when the ICU is supplied with power, it boots up, detects a phone line and dial tone, and dials its default toll-free number that terminates on the CCS. Once a connection is established, the ICU sends its serial number and password to the CCS for authentication. Once the ICU has been authenticated, the CCS queries its database and retrieves pertinent information for the ICU. The information downloaded to the ICU may include current date and time, day of week, watering schedule for each irrigation station, current ET value, local phone number to call for next update, time interval between call attempts to local phone number, maximum call attempts to local phone number, user ID and password, date and time for next update, etc.

When the initialization call terminates, the ICU set-up process is complete. The current date and time are used to set the internal ICU clock. The ICU uses this information to activate the irrigation schedule. When it is time to update the irrigation schedule, the ICU places a call to the CCS (504). In some embodiments, the call is made to an Internet service provider (ISP) using the local phone number provided to the ICU. In some embodiments, authentication is optionally performed. Authentication information such as ICU's serial number and password may be verified before any further action is taken. Once the ICU is authenticated by the CCS, it uploads status data to the CCS (505). The status data may include diagnostic data about its last irrigation cycle (start time, completion time, valve failures, etc.), any problems encountered during call attempts to the CCS, any manual watering activity, any changes to the automated watering schedule using the ICU adjustment mechanism, and any other data required by the CCS.

It is then determined whether there is any change in parameters such as the reference ET, user-set or system-set parameters, etc. If there is no change, a notification indicating no change is sent to the ICU (508) and the ICU continues to execute the same irrigation schedule (512). If, however, there are changes in the parameters, a new irrigation schedule is then sent to the ICU (510). In some embodiments, additional information such as the date and time for the ICU to make another call to the CCS is also sent. In some embodiments, software or firmware upgrades for the ICU are downloaded as well. In some embodiments, a new irrigation schedule is sent to the ICU during every call to the CCS regardless of whether there have been changes to the irrigation schedule.

When it is time to irrigate, the ICU executes the new sequence (512). In some embodiments, the ICU opens the valve for each station by applying the necessary voltage. The ICU then runs through the complete irrigation schedule for all the stations (including any repeat cycles for individual stations, if required) until the entire watering cycle is complete. The ICU waits until the next scheduled call time (514), when it places another call to the CCS (504) and the process repeats.

In some embodiments, the ICU has a factory default irrigation schedule that is stored in non-volatile memory at the time of manufacture. In some embodiments, the factory default irrigation schedule may be zero minutes (i.e., no irrigation) per station. If an ICU is unable to complete its initialization call (for instance, if there is no active phone line at the property), the ICU then automatically runs its default irrigation schedule. The user can change the default setting using an input device supplied by the ICU, such as a keypad. The ICU then implements the latest default irrigation schedule until the default setting is again changed or a phone line is installed and the ICU is initialized.

After the ICU is initialized with the CCS, the ICU still may not be able to connect with the CCS during a call attempt. Communication problems such as not having a dial tone may cause the connection to fail. In the event of a connection failure, the ICU operates in its default mode. In some embodiments, in default mode, the ICU runs the factory default irrigation schedule (for example, each station may irrigate for the same number of minutes). In some embodiments, in default mode, the ICU continues to implement the most recent irrigation schedule received from the CCS. In some embodiments, in default mode, the user overrides the factory default and changes the watering interval by inputting the information directly into the ICU. In some embodiments, a notification such as an email may be sent to inform the user of the communication problem.

FIGS. 6A-6B are diagrams illustrating the user interface for changing automated irrigation schedule for a station according to one embodiment. In this example, the ALICS web server provides an online tool for users to modify the automated watering schedule generated by the CCS. The tool includes a graphic indicator that enables the user to increase or decrease the water output for one or more stations by moving the indicator. In the embodiment shown, the user interface includes a slide bar 600 for each station. The user can adjust the slide bar using sliding button 602 to increase or decrease the amount of water applied to that station. In some embodiments, the user clicks on a link and a drop down box appears on the user interface enabling the user to select the exact adjustment required.

As shown in FIG. 6A, the slide bar is initially set to the middle position representing an indexed value of 1 (the CCS-calculated water output) for each station. Other index values may be used in some embodiments. If the user feels that the landscape is too dry and the plants are not getting enough water, then he can slide the bar in the direction labeled "increase watering". The display shows the change as a percentage so the user knows the extent of the change.

In the example shown in FIG. 6B, the user moves the bar in the "add water" direction to a position of 1.20. Accordingly, the CCS calculates a new schedule that increases the water output by 20%. If the landscape seems overly moist or the user would like to conserve water and reduce his water bill, then he can move the bar in the direction labeled "decrease watering" and the CCS reduces the water output by the indicated percentage. The user can make adjustments for other stations in a similar manner. In some embodiments, the estimated impact of any changes made to the automated watering schedule on total irrigation water usage and the user's water bill are also calculated and displayed. In some embodiments, whenever a user adjusts the water output for any station, a record of the change is stored on the CCS and an exception report is generated for use by the ALICS and the local water agency. These exception reports provide feedback to the ALICS and local water agencies regarding user acceptance of the automated watering schedules.

In some embodiments, the watering schedule may also be changed via an adjustment interface (such as a keypad or touch screen) provided by the ICU. The adjustment interface on the ICU provides similar functionality as the online tool. It can be adjusted to increase or decrease the water output in percentage increments for any station. The adjustment mechanism on the ICU enables the user to make changes to the ICU watering schedule when it is not convenient or possible to access the web application. In some embodiments, the adjustment is sent automatically to the CCS to be used to adjust the station's irrigation schedule. The revised schedule can be viewed via the web interface.

The irrigation schedule is modified by the ALICS via the CCS in some embodiments. For example, a water agency sometimes requires that the overall amount of water used in irrigation be reduced or that the pattern of usage among its customers be modified. In some embodiments, an administrator of the water agency sends a request to the ALICS via an online tool. In response to the water agency's request, the ALICS administrator then modifies the start time, watering duration, or other appropriate parameters of the irrigation schedule. In some embodiments, the ALICS administrator makes the changes after verifying that the property owners have given permissions to such changes.

Whether the modification is performed by the owner of the property, the ALICS administrator, or any other appropriate party, it is preferable that the graphic indicator for the web application is automatically adjusted to reflect the change. In some embodiments, the user is notified of the changes via an electronic message.

In some embodiments, the ALICS gathers irrigation usage data from multiple sites and then stores the data. The ALICS can also compare data entered by the users with the actual usage data, thus able to detect patterns between users, landscapes, and irrigation usage. Such information is useful for the improvement of the ALICS as well as ALICS business partners such as water agencies. In some embodiments, the ALICS offers web access to its business partners. The business partners are provided with user IDs and passwords for access to the partner website. Information available to the partners includes property characteristics, watering habits, and irrigation usage among all ALICS users within certain service areas. The partners may also view and manipulate the ALICS' user data as well as generate a variety of reports.

Examples of user data available to partners include percent of irrigation usage by hour of day, day of week or month, number of ICUs or stations in use by hour of day, comparison of average ET and irrigation usage by microclimate zone, number of stations running at, above, and below CCS-calculated watering schedules, percent of users supplementing automated schedule with manual watering, amount of manual watering as a percent of total irrigation usage, percent of landscapes with lawns or other landscape characteristics, average number of stations per ICU, percent of irrigation usage by landscape type, number and duration of ICUs running in default mode, number of ICUs reporting valve malfunctions, usage of the ALICS' user website including percentage of users completing set-up process, percentage and frequency of repeat usage, reason for repeat usage, etc.

Examples of reports available to partners include ICUs running above CCS-calculated watering schedule by percentage deviation, ICUs running below CCS-calculated watering schedule by percentage deviation, ICUs running manual programs, ICU ranking by total minutes of irrigation usage, ICUs running in default mode, ICUs reporting valve trouble, users with lawns, users adjusting automated watering schedule by amount of change, users with inefficiently-designed landscapes (this data is gleaned from information entered by users regarding their landscaped areas during the online user set-up process), etc.

In some embodiments, the ALICS is coupled with existing automatic water meter reading (AMR) systems. The ICU is configured to receive data signals transmitted from an ARM unit. In some embodiments, the data signal is transmitted as a wireless signal, and the ICU includes a wireless adaptor for receiving the signal. The data, which includes meter information, is stored in the ICU and uploaded to the CCS during the ICU's next scheduled call to the CCS.

In some embodiments, the ICU obtains a meter reading at the beginning of every irrigation session for each station, then a second meter reading at the end of the session. The CCS uses the meter readings to calculate the actual water flow rate for each ICU station and accordingly adjust the precipitation rate for each station. Station flow rates calculated from meter readings are also used to determine the number of simultaneous valves that may operate and the resulting ICU watering schedule. Flow rates obtained from meter data enable the CCS to more accurately calibrate the precipitation rate as well as the automated watering schedule for that station. Any indoor or outdoor water leaks may also be detected based on the meter readings. In some embodiments, the ALICS is provided with typical leak flow patterns by water agencies and the CCS identifies possible leaks by comparing meter readings sent by the ICU to the provided leak flow patterns. In addition, possible leaks are identified from meter readings taken at times when water is typically not used at a site.

Meter data can also be provided to users and partners via the website and email. In some embodiments, detailed usage summary and reports are provided. The information can be used to provide analysis on water irrigation use as a percentage of total household water use, actual irrigation water use compared to optimal water use as determined by ET, impact of scheduling restrictions, impact of conservation incentive programs, impact of price adjustments on water use, etc. The information can also be used to assist in landscape design modifications (changing plant type, reducing the number of plants, using reduced-flow emitters or sprinklers, etc.) or irrigation schedule adjustments. In some embodiments, the meter data captured for various users are aggregated, enabling the analysis of data at different levels such as street, neighborhood, pipeline, etc. During droughts, water agencies sometimes issue restrictions on water usage. The data obtained from the ICUs can also be used to facilitate the enforcement of water agency restrictions.

In some embodiments, the ICU is coupled with a flow meter configured to measure water flow. The ICU is configured to read flow data for each station and the data is automatically sent to the CCS. The individual station flow rate can be displayed via the web application. In some embodiments, to monitor valve function, the electrical current flow in the valves is detected and reported by the ICU to the CCS.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling an irrigation system, comprising:
   receiving at a central control system configured to control with respect to each of a plurality of properties, each owned by a different property owner, one or more irrigation control units associated with that property, a first landscape information associated with a first irrigation site associated with a first property owner and a second landscape information associated with a second irrigation site associated with a second property owner;
   receiving a first environmental information associated with the first irrigation site and a second environmental information associated with the second irrigation site;
   deriving a first individual station irrigation schedule for the first irrigation site based on the first landscape information and the first environmental information and a second individual station irrigation schedule for the second irrigation site based on the second landscape information and the second environmental information; and
   sending the first individual station irrigation schedule to a first irrigation control unit associated with the first irrigation site and the second individual station irrigation schedule to a second irrigation control unit associated with the second irrigation site;
   wherein the first property owner and the second property owner are included in a plurality of users of the central control system; the central control system is configured to communicate with a plurality of hosts, each associated with one or more users, and to provide access via such hosts to a user interface associated with the central control system; and the central control system is configured to provide to each user who uses one of the plurality of hosts to access the user interface information and controls only for those properties with which that user is associated.

2. A method of controlling an irrigation system as recited in claim 1, wherein the first individual station irrigation schedule is sent to the first irrigation control unit via a network.

3. A method of controlling an irrigation system as recited in claim 1, wherein the first individual station irrigation schedule is sent to the first irrigation control unit via the Internet.

4. A method of controlling an irrigation system as recited in claim 1, wherein the first individual station irrigation schedule is sent to the first irrigation control unit via a telephone line.

5. A method of controlling an irrigation system as recited in claim 1, wherein the first landscape information and the first environmental information are provided to a central control system.

6. A method of controlling an irrigation system as recited in claim 1, wherein providing the first landscape information includes configuring a landscape parameter via a web interface.

7. A method of controlling an irrigation system as recited in claim 1, further comprising updating the first environmental information.

8. A method of controlling an irrigation system as recited in claim 1, wherein the first landscape information includes soil type.

9. A method of controlling an irrigation system as recited in claim 1, wherein the first landscape information includes slope information.

10. A method of controlling an irrigation system as recited in claim 1, wherein the first landscape information includes plant type.

11. A method of controlling an irrigation system as recited in claim 1, wherein the first landscape information includes age of plant.

12. A method of controlling an irrigation system as recited in claim 1, wherein the first environmental information includes evapotranspiration (ET) information.

13. A method of controlling an irrigation system as recited in claim 1, wherein the first environmental information includes weather information.

14. A method of controlling an irrigation system as recited in claim 1, wherein the first individual station irrigation schedule includes a restriction on the amount of water used.

15. A method of controlling an irrigation system as recited in claim 1, wherein the first individual station irrigation schedule includes a valve command.

16. A method of controlling an irrigation system as recited in claim 1, further comprising updating the first environmental information.

17. A method of controlling an irrigation system as recited in claim 1, wherein deriving the first individual station irrigation schedule and the second individual station irrigation schedule includes balancing usage with other sites.

18. A method of controlling an irrigation system as recited in claim 1, wherein deriving the first individual station irrigation schedule and the second individual station irrigation schedule includes providing biasing information.

19. A method of controlling an irrigation system as recited in claim 1, wherein deriving the first individual station irrigation schedule and the second individual station irrigation schedule includes accounting for needs of the most demanding plant.

20. A method of controlling an irrigation system as recited in claim 1, wherein deriving the first individual station irrigation schedule and the second individual station irrigation schedule includes selecting an algorithm used for deriving an irrigation schedule from a plurality of algorithms.

21. A method of controlling an irrigation system as recited in claim 1, wherein the first irrigation control unit is connected to Internet via a local point of presence (POP).

22. A method of controlling an irrigation system as recited in claim 1, wherein the first individual station irrigation schedule is sent to the first irrigation control unit via Internet.

23. A method of controlling an irrigation system as recited in claim 1, wherein sending the first individual station irrigation schedule to the first irrigation control unit is initiated by the first irrigation control unit.

24. A method of controlling an irrigation system as recited in claim 1, wherein sending the first individual station irrigation schedule to the first irrigation control unit is initiated by the first irrigation control unit and the first irrigation control unit uses a pull model to request the first individual station irrigation schedule.

25. A method of controlling an irrigation system as recited in claim 1, wherein the first irrigation control unit communicates with a watering station via a shared phone line.

26. A method of controlling an irrigation system as recited in claim 1, in the event that sending the first individual station irrigation schedule fails, further comprising providing an alert.

27. A method of controlling an irrigation system as recited in claim 1, in the event that sending the first individual station irrigation schedule fails, further comprising performing irrigation using a stored irrigation schedule on the first irrigation control unit.

28. A method of controlling an irrigation system as recited in claim 1, further comprising providing analysis of water usage to a water agency.

29. A method of controlling an irrigation system as recited in claim 1, further comprising uploading meter data from the first irrigation control unit to a central control.

30. A method of controlling an irrigation system as recited in claim 1, further comprising viewing the first landscape information and/or the first individual station irrigation schedule via a web interface.

31. A method of controlling an irrigation system as recited in claim 1, further comprising modifying the first landscape information and/or the first individual station irrigation schedule via a web interface.

32. A method of controlling an irrigation system as recited in claim 1, further comprising viewing landscape information and/or irrigation schedules for a plurality of geographically dispersed sites via a web interface.

33. A method of controlling an irrigation system as recited in claim 1, further comprising modifying landscape information and/or irrigation schedules for a plurality of geographically dispersed sites via a web interface.

34. A method of controlling an irrigation system as recited in claim 1, wherein the first landscape information includes irrigation method.

35. A method of controlling an irrigation system as recited in claim 1, wherein the first landscape information includes precipitation rate.

36. A method of controlling an irrigation system as recited in claim 1, wherein the first landscape information includes distribution uniformity.

37. A method of controlling an irrigation system as recited in claim 1, wherein the first landscape information includes root depth of plant.

38. A method of controlling an irrigation system as recited in claim 1, wherein the first landscape information includes dripline diameter of plant.

39. A method of controlling an irrigation system as recited in claim 1, wherein the first landscape information includes number of emitters per plant.

40. A method of controlling an irrigation system as recited in claim 1, wherein the first landscape information includes flow rate of emitter.

41. A method of controlling an irrigation system as recited in claim 1, wherein the first landscape information includes sun exposure information.

42. A method of controlling an irrigation system as recited in claim 1, wherein the first landscape information includes plant coefficient by month.

43. A method of controlling an irrigation system as recited in claim 1, wherein the first individual station irrigation schedule is optimized for one or more stations.

44. A method of controlling an irrigation system as recited in claim 1, wherein the first individual station irrigation schedule includes multiple stations operating simultaneously.

45. A method of controlling an irrigation system as recited in claim 1, wherein the first individual station irrigation schedule is derived using station flow rates and maximum allowable system flow.

46. A method of controlling an irrigation system as recited in claim 1, wherein the first individual station irrigation schedule is automatically adjusted for rainfall.

47. A method of controlling an irrigation system as recited in claim 1, wherein deriving the first individual station irrigation schedule and the second individual station irrigation schedule includes minimizing runoff.

48. A method of controlling an irrigation system as recited in claim 1, wherein the first individual station irrigation schedule includes hourly restrictions.

49. A method of controlling an irrigation system as recited in claim 1, wherein the first individual station irrigation schedule includes non-watering days.

50. A method of controlling an irrigation system as recited in claim 1, wherein deriving the first individual station irrigation schedule includes accounting for the priority of stations.

51. A method of controlling an irrigation system as recited in claim 1, wherein the first landscape information includes seasonality of plants.

52. A method of controlling an irrigation system as recited in claim 1, wherein the first individual station irrigation schedule is derived using station flow rates provided by a flow sensor.

53. A method of controlling an irrigation system as recited in claim 1, wherein the first individual station irrigation schedule is optimized to fit within a user-defined water window.

54. A method of controlling an irrigation system as recited in claim 1, wherein the first individual station irrigation schedule includes individual station schedules derived using a plurality of algorithms.

55. A method of controlling an irrigation system as recited in claim 1, wherein deriving the first individual station irrigation schedule includes selecting an algorithm based on an irrigation method.

56. A method of controlling an irrigation system as recited in claim 1, wherein deriving the first individual station irrigation schedule includes selecting an algorithm based on geographic location.

57. A method of controlling an irrigation system as recited in claim 1, wherein the first individual station irrigation schedule is derived using station flow rates provided by a water meter.

58. A method of controlling an irrigation system as recited in claim 1, further comprises uploading meter data from a water meter to the first irrigation control unit.

59. A method of controlling an irrigation system as recited in claim 1, further including displaying an effect of modifying the first individual station irrigation schedule, including displaying a change to a water bill.

60. A method of controlling an irrigation system as recited in claim 1, wherein there are a plurality of individual station irrigation schedules accessible via a web interface, the first user has a first access privilege to the plurality of individual irrigation schedules via the web interface, and the second user has a second access privilege to the plurality of individual irrigation schedules via the web interface.

61. A method of controlling an irrigation system as recited in claim 1, wherein the first individual station irrigation schedule that is sent to the first irrigation control unit specifies, without reference to a default or reference schedule, a watering schedule to be implemented at the first irrigation site.

62. A method of controlling an irrigation system as recited in claim 1, wherein the first individual station irrigation schedule specifies one or more of a start flow time and a stop flow time of a first individual station valve associated with the first irrigation control unit.

63. A method of controlling an irrigation system as recited in claim 1, wherein:
a third user has access to at least one of (1) the first landscape information, (2) the first environmental information, or (3) the first individual station irrigation schedule and access to at least one of (1) the second landscape information, (2) the second environmental information, or (3) the second individual station irrigation schedule.

64. A method of controlling an irrigation system as recited in claim 63, wherein the third user has access to trend data associated with the first and second irrigation sites.

65. An irrigation system comprising:
a memory coupled with the processor, wherein the memory is configured to provide the processor with instructions which when executed cause the processor to:
receive at a central control system configured to control with respect to each of a plurality of properties, each owned by a different property owner, one or more irrigation control units associated with that property, a first landscape information associated with a first irrigation site associated with a first property owner and a second landscape information associated with a second irrigation site associated with a second user property owner;
receive a first environmental information associated with the first irrigation site and a second environmental information associated with the second irrigation site;
derive a first individual station irrigation schedule for the first irrigation site based on the first landscape information and the first environmental information and a second individual station irrigation schedule for the second irrigation site based on the second landscape information and the second environmental information; and
send the first individual station irrigation schedule to a first irrigation control unit associated with the first irrigation site and the second individual station irrigation schedule to a second irrigation control unit associated with the second irrigation site;
wherein the first property owner and the second property owner are included in a plurality of users of the central control system; the central control system is configured to communicate with a plurality of hosts, each associated with one or more users, and to provide access via such hosts to a user interface associated with the central control system; and the central control system is configured to provide to each user who uses one of the plurality of hosts to access the user interface information and controls only for those properties with which that user is associated.

66. A computer program product for controlling an irrigation system, the computer program product being embodied in a computer readable medium and comprising computer instructions for:
receiving at a central control system configured to control with respect to each of a plurality of properties, each owned by a different property owner, one or more irrigation control units associated with that property, a first landscape information associated with a first irrigation site associated with a first property owner and a second landscape information associated with a second irrigation site associated with a second property owner;
receiving a first environmental information associated with the first irrigation site and a second environmental information associated with the second irrigation site;
deriving a first individual station irrigation schedule for the first irrigation site based on the first landscape information and the first environmental information and a second individual station irrigation schedule for the second irrigation site based on the second landscape information and the second environmental information; and
sending the first individual station irrigation schedule to a first irrigation control unit associated with the first irrigation site and the second individual station irrigation schedule to a second irrigation control unit associated with the second irrigation site;
wherein the first property owner and the second property owner are included in a plurality of users of the central control system; the central control system is configured to communicate with a plurality of hosts, each associated with one or more users, and to provide access via such hosts to a user interface associated with the central control system; and the central control system is configured to provide to each user who uses one of the plurality of hosts to access the user interface information and controls only for those properties with which that user is associated.

* * * * *